United States Patent
Eatedali et al.

(10) Patent No.: US 11,192,028 B2
(45) Date of Patent: Dec. 7, 2021

(54) SYSTEMS AND METHODS FOR THE REAL-TIME CUSTOMIZATION OF VIDEO GAME CONTENT BASED ON PLAYER DATA

(71) Applicant: Activision Publishing, Inc., Santa Monica, CA (US)

(72) Inventors: Josiah Eatedali, Los Angeles, CA (US); Robert D. Schonfeld, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 7 days.

(21) Appl. No.: 16/686,443

(22) Filed: Nov. 18, 2019

(65) Prior Publication Data

US 2020/0155943 A1    May 21, 2020

Related U.S. Application Data

(60) Provisional application No. 62/769,180, filed on Nov. 19, 2018.

(51) Int. Cl.
*A63F 13/67*    (2014.01)

(52) U.S. Cl.
CPC .................. *A63F 13/67* (2014.09)

(58) Field of Classification Search
CPC .......... A63F 13/60; A63F 13/63; A63F 13/67; A63F 13/79; A63F 13/35
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Chase E Leichliter
(74) *Attorney, Agent, or Firm* — Novel IP

(57) ABSTRACT

The present specification describes systems and methods for customizing a video game to a player defined time period. Content units of a video game are selected based on at least one of multiple pre-defined criteria. Content units are then edited to fit into the player defined time period. Game gear required for playing the selected content units is determined. The edited content units and the selected game gear are provided to the player to play within the player defined time period.

31 Claims, 6 Drawing Sheets

(56) References Cited

U.S. PATENT DOCUMENTS

| | | |
|---|---|---|
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,289,165 B1 * | 9/2001 | Abecassis .............. G11B 27/34 386/224 |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |

(56) References Cited

U.S. PATENT DOCUMENTS

| | | |
|---|---|---|
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Singh |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Singh |
| 9,764,244 B2 | 9/2017 | Singh |
| 9,789,406 B2 | 10/2017 | Marr |
| 9,808,722 B2 | 11/2017 | Kawachiya |
| 2005/0255923 A1* | 11/2005 | Aoki .................. A63F 13/12 463/43 |
| 2009/0113448 A1 | 4/2009 | Smith |
| 2009/0149246 A1* | 6/2009 | Opaluch ............. A63F 13/10 463/29 |
| 2012/0077590 A1* | 3/2012 | Yamamoto ......... A63F 13/577 463/31 |
| 2012/0190444 A1* | 7/2012 | Fujisawa ............ A63F 13/56 463/31 |
| 2012/0278439 A1* | 11/2012 | Ahiska ............... A63F 13/358 709/218 |
| 2013/0005452 A1* | 1/2013 | Chatani .............. A63F 13/35 463/29 |
| 2013/0079132 A1* | 3/2013 | Archer ............... A63F 13/77 463/31 |
| 2014/0179427 A1* | 6/2014 | Miura ................ A63F 13/00 463/31 |
| 2014/0179428 A1* | 6/2014 | Miura ................ A63F 13/355 463/31 |
| 2014/0344725 A1 | 11/2014 | Bates |
| 2016/0191671 A1 | 6/2016 | Dawson |
| 2016/0228776 A1* | 8/2016 | Miura ................ A63F 13/795 |
| 2018/0117477 A1* | 5/2018 | Miura ................ H04N 21/4781 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |

(56) References Cited

FOREIGN PATENT DOCUMENTS

| | | |
|---|---|---|
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

SYSTEMS AND METHODS FOR THE REAL-TIME CUSTOMIZATION OF VIDEO GAME CONTENT BASED ON PLAYER DATA

CROSS REFERENCE

The present application relies on U.S. Patent Provisional Application No. 62/769,180, entitled "Systems and Methods for the Real-Time Customization of Video Game Content Based on Player Data" and filed on Nov. 19, 2018, for priority, which is herein incorporated by reference in its entirety.

FIELD

The present specification is related generally to the field of gaming, animation and computer graphics. More specifically, the present specification discloses systems and methods for providing a customized gaming experience to players by customizing, or curating, in real-time video game content based on user data.

BACKGROUND

The proliferation of broadband services allows for a greater number of people to enjoy computer or video games. There are numerous games available to cater to a wide variety of player interests. While new game consumers may have the funds available to play a game, many may have time constraints that will de-incentivize, dissuade, or otherwise discourage a person from playing a game requiring substantial amount of time. Subscription models, in which a user pays a small amount per time period rather than a full purchase price upfront, allow for new game consumers to experience games that they do not have time to play and have been increasingly popular ways to bring back older games that a player may want to revisit or try.

Even with such a subscription model, however, players are hesitant to invest time into a new game out of concern that, to truly have a full game experience, they will have to devote more time than they may have available, given that many games require a substantial amount of time for completion. Players often give up playing games before completion either due to time constraints or because they lose interest in the course of an extended gameplay session. Accordingly, some players may play the game only intermittently or only visit the game website or use the game app in rare instances. Particularly in the smart mobile device market sector, players are very time sensitive and tend to skip or switch to another game, application, channel or device webpage, whenever they feel disengaged with a game. Players may also want to play multiple games in the limited time they have in order to enjoy the experience of multiple gameplay sessions.

Thus, there is a need for methods and systems that allow for the dynamic curating or customization of a video game experience to the time available to a user, or to other player-specific usability constraints. There is a need for video games to be designed such that they maximize player engagement and retention within the limited time available with the players and also improve the experience of playing and performing in video games for players. Finally, there is a need for systems and methods that customize video game content and the gaming experience based on a player's interests.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method for generating, in real-time, a video game tailored to a player-defined time period, the video game having a standard gameplay time greater than the player-defined time period, the method comprising: receiving the player-defined time period; selecting one or more content units of the video game based on the player-defined time period, wherein the one or more content units are defined by a collective time period; editing the selected one or more content units such that the collective time period is equal to or less than the player-defined time period; selecting one or more game gear items required for playing the selected one or more content units based on at least one of a plurality of pre-defined criteria; and generating a tailored gameplay session comprising the edited one or more content units and selected one or more gear items for the player to play.

Optionally, the method further comprises: determining if the player wants to alter the player-defined time period to a new time period; if the player wants to alter the player defined time period to a new time period, selecting the one or more content units based on at least one of a plurality of pre-defined criteria; editing the one or more content units to have a collective time period that is equal to or less than the new time period; selecting one or more game gear required for playing the one or more content units based on at least one of a plurality of pre-defined criteria; and generating a new tailored gameplay session comprising the edited one or more content units and one or more game gear for the player for play. The new time period may be longer or than the player defined time period.

Optionally, the method further comprises: dynamically determining if the player is completing the one or more content units within a pre-defined time allocated for each of the one or more content units; and providing one or more pre-defined options for completing the one or more content units within the player-defined time period if the player is not completing the one or more content units within the pre-defined time allocated for each of the one or more content units.

Optionally, the method further comprises: selecting the one or more content units based on at least one of a plurality of pre-defined criteria, wherein the plurality of pre-defined criteria comprises at least one of selecting one or more content units rated as providing a best experience while maintaining a narrative of the game; selecting one or more content units rated as being most fun regardless of maintaining cohesion in the narrative of the game; and selecting one or more content units rated as providing a most challenging experience.

Optionally, selecting one or more content units further comprises: determining an amount of time required for completing each selected of the one or more content units; and applying the player-defined time period as a filter to identify all of the one or more content units having the collective time period that is less than or equal to the player-defined time period. Optionally, the method further comprises editing the one or more content units to provide a linear gameplay experience to the player.

Optionally, the method of further comprises adding one or more messages before each of the selected one or more content units for explaining a narrative corresponding to the gameplay session.

Optionally, presenting the selected game gear to the player comprises enabling the player to select an extent of game gear ranging from 'minimum gear' to 'maximum gear'.

The present specification also discloses a system for generating, in real-time, a video game tailored to a player-defined time period, the video game having a standard gameplay time greater than the player-defined time period, the system comprising one or more game servers for hosting the game and a plurality of client processors for executing an instance of the game communicated by the one or more game servers via a network coupling the client processors to the game servers, said game servers comprising one or more processors configured to execute a plurality of executable programmatic instructions to generate, in real-time, the video game tailored to a player-defined time period, the programmatic instructions forming: a user interface module which when executed receives the player-defined time period; a selection module which when executed selects one or more content units of the video game based on the player-defined time period, and one or more game gear items required for playing the selected one or more content units based on at least one of a plurality of pre-defined criteria, wherein the one or more content units are defined by a collective time period; and an editing module which when executed edits the selected one or more content units such that the collective time period is equal to or less than the player-defined time period for generating a tailored gameplay session comprising the edited one or more content units and selected one or more gear items for the player to play.

Optionally, the one or more game servers are coupled with at least one database for storing a plurality of video games, each video game comprising discrete content units, each content unit being associated with a metadata tag.

Optionally, each metadata tag comprises predefined characteristics of an associated video game content unit. Optionally, the predefined characteristics comprise one or more of: a time to complete playing a portion of the content unit of the video game, a required relationship with one or more other content units, and one or more descriptors indicative of the subject matter of the content unit. Optionally, the one or more descriptors indicative of the subject matter of the content unit comprise one or more of: most fun content, most challenging experience, scariest content, easiest gameplay experience, and liked most by other similar players.

Optionally, The system of claim 12 wherein the metadata tags are used by the selection module for selecting one or more content units of the video game based on the player-defined time period.

Optionally, the selection module, when executed, further selects a second set of content units based on at least one of a plurality of pre-defined criteria, if the player wants to alter the player defined time period to a new time period, and a second set of game gear required for playing the second set of content units based on at least one of a plurality of pre-defined criteria and, the editing module, when executed, further edits the second set of content units to have a collective time period that is equal to or less than the new time period, and generates a new tailored gameplay session comprising the edited second set of content units and the second set of game gear for the player for play.

Optionally, the selection module, when executed, further dynamically determines if the player is completing the one or more content units within a pre-defined time allocated for each of the one or more content units and provides one or more pre-defined options for completing the one or more content units within the player-defined time period if the player is not completing the one or more content units within the pre-defined time allocated for each of the one or more content units.

Optionally, the one or more game servers are implemented by a cloud of computing platforms operating together as game servers.

The present specification also discloses a computer readable non-transitory medium comprising a plurality of executable programmatic instructions wherein, when said plurality of executable programmatic instructions are executed by a processor in a computing device, a process for generating, in real-time, a video game tailored to a player-defined time period is performed, the video game having a standard gameplay time greater than the player-defined time period, said plurality of executable programmatic instructions comprising: programmatic instructions, stored in said computer readable non-transitory medium, for generating, in real-time, the video game tailored to a player-defined time period by: receiving the player-defined time period; selecting one or more content units of the video game based on the player-defined time period, wherein the one or more content units are defined by a collective time period; editing the selected one or more content units such that the collective time period is equal to or less than the player-defined time period; selecting one or more game gear items required for playing the selected one or more content units based on at least one of a plurality of pre-defined criteria; and generating a tailored gameplay session comprising the edited one or more content units and selected one or more gear items for the player to play.

The aforementioned and other embodiments of the present specification shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings.

DETAILED DESCRIPTION

Figure 1A:
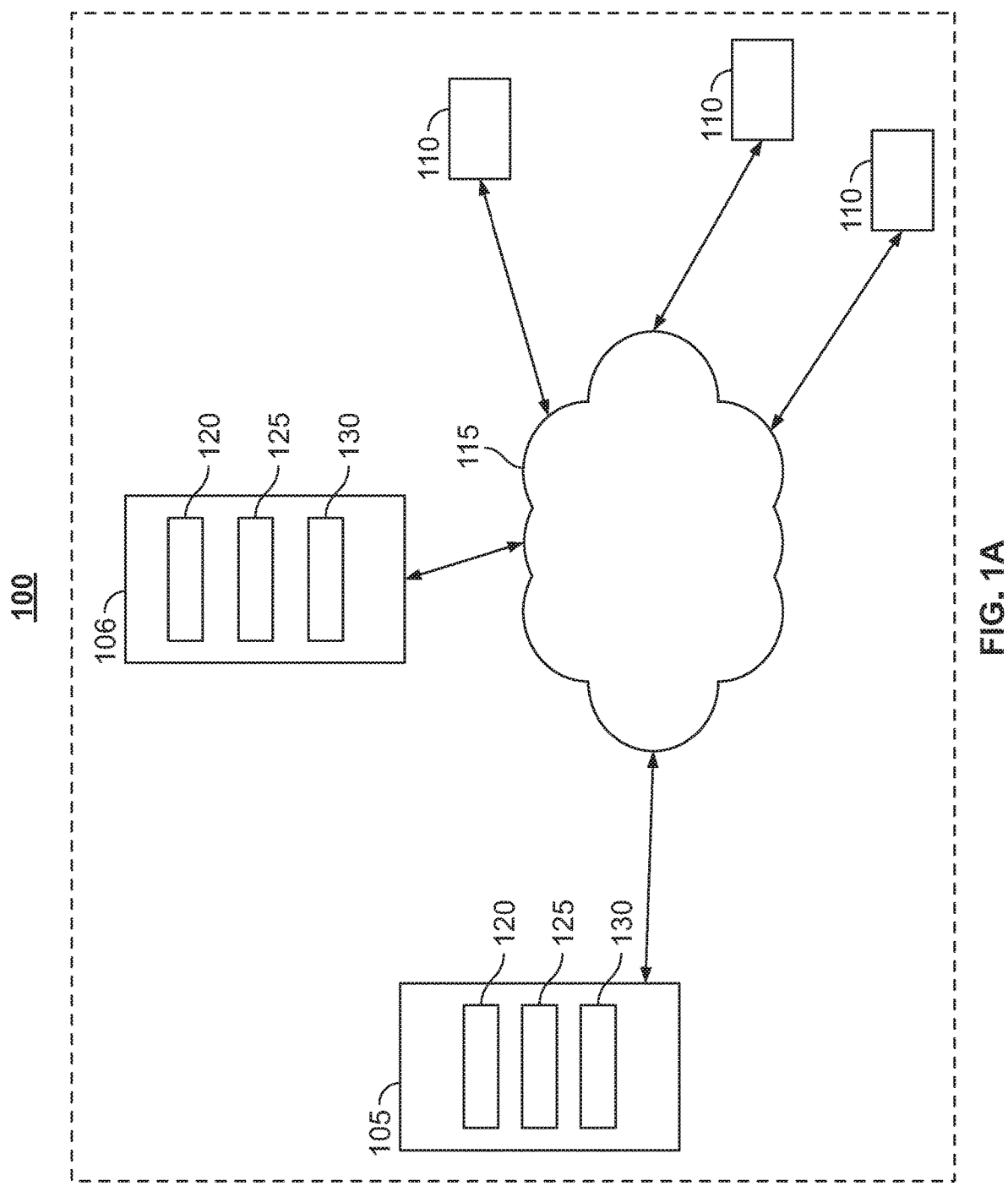
FIG. 1A is a block diagram showing of a client-server architecture of a gaming system, in accordance with embodiments of the present specification.

In various embodiments, the present specification describes systems and methods for providing video game content that, in real-time, may be adjusted to fit within a player-defined time period, in accordance with an embodiment of the present specification. In embodiments, the present specification provides a method allowing a player to select both a video game and period of time for playing the game. The present specification provides systems and methods for selecting portions of the player-specified game and editing or adjusting the selected portions to fit within the player-specified time period, thereby allowing the player to enjoy the gameplay experience despite time constraints. In various embodiments, the present specification provides methods of selecting the portions of a video game based on multiple criteria (such as popularity ratings) for providing the player maximum enjoyment.

While aspects of the present specification may be described herein with reference to particular types of video game genres, the system and method described in detail herein may be used in any genre of single or multiplayer video games.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise. The term "plurality of programmatically separate video games" means more than one video game where each of the video games comprises one or more separate executable files and can be fully played and engaged with independent of any other video game.

The terms "user" and "player" are used interchangeably throughout this specification.

The term "real-time" refers to the substantially immediate response of a system in response to a user input. For example, in this case, the term "real-time" refers to the substantially immediate action, by the system, to curate or customize content to a user upon receiving an input from the user indicative of a time period available to play the video game. Such a substantially immediate action may mean less than 20 minutes, preferably less than 10 minutes, and even more preferably less than 5 minutes between receiving a user's input regarding a preferred game and time period available to play and the generation and provision of the customized gameplay session.

FIG. 1 illustrates a gaming system 100, in accordance with an embodiment of the present specification. The system 100 comprises client-server architecture, where one or more game servers 105, 106 are in communication with one or more remotely located client devices 110 over a network 115. Users may access the system 100 via the client devices 110 that may include, but not be limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105, 106 over the network 115. The one or more game servers 105, 106 are responsible for hosting, running, or executing a video game, and the remotely located client devices 110 are configured to execute an instance of the video game.

The video game may be from any video game genre. Video game genres include 1) action games, such as platform, shooter, fighting, stealth, survival, and rhythm games, 2) action-adventure games, such as survival horror or metroidvania games, 3) adventure games, such as text, graphic, visual, interactive or real-time 3D adventures, 4) role-playing games, such as action RPG, MMORPG, Roguelikes, tactical RPG, sandbox RPG, first-person party-based RPG, cultural differences, choices, or fantasy games, 5) simulation games, construction and management simulation, life simulation, or vehicle simulation games, 6) strategy games, such as 4X, artillery, real-time strategy, real-time tactics, multiplayer online baffle arena, tower defense, turn based strategy, turn based tactics, wargame, or grand strategy games, 7) sports games, such as racing, competitive, basketball, football, baseball, soccer, hockey, or sports-based fighting, or 8) the following other genres: MMO, casual, party, programming, logic, trivia, board, card, advergame, art, or educational.

The one or more game servers 105, 106 may be any computing device having one or more processors and one or more computer-readable storage media such as RAM, hard disk or any other optical or magnetic media. The one or more game servers 105, 106 include a plurality of hardware, software, and/or firmware components operating together to provide or implement a plurality of functional, operational or service-oriented modules. In some embodiments, the one or more game servers 105, 106 include or are in communication with a game database system (not shown).

In one embodiment, each game server is associated with a separate game database system. In another embodiment, a common database system may serve two or more game servers. The game database system stores a plurality of game data associated with one or more games that are served or provided to the client devices 110 over the network 115. In one embodiment, the game database system comprises a plurality of databases, each storing a different type, format, or kind of data. In some embodiments, the one or more game servers 105, 106 may be implemented by a cloud of computing platforms operating together as game servers. In embodiments, a game server is another home console, a personal computing device, such as a laptop or tablet PC, or a dedicated server.

In one embodiment, the gaming system 100 comprises a plurality of distributed video game servers, wherein each of the distributed video game servers is configured to host and manage a video game title. As defined herein, the distributed game servers refer to a system of computing platforms that are capable of communicating and coordinating with one another. In one embodiment, the computing platforms comprising the distributed servers are hosted on the cloud. For the purpose of the present specification, a video game title is defined as an electronic game that involves interaction with a user interface to generate visual feedback on a display device.

In accordance with aspects of the present specification, the one or more game servers 105, 106 provide or implement a plurality of modules such as, but not limited to, a selection module 120 and an editing module 130. In one embodiment, the various modules are hosted on a cloud of computing platforms, collectively known as the backend. In the following description, the terms 'game server' and 'backend' are used interchangeably. In some embodiments, the one or more client devices 110 are configured to implement or execute one or more of the plurality of modules that are the same as or similar to the modules of the one or more game servers 105. For example, in some embodiments the client devices 110 execute a client-side selection module 120.

It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game database system, and executed by a processor.

In an embodiment, user input module 125 is configured to generate a plurality of interfaces designed to elicit and receive data from a user indicative of an amount of time available to play a video game and optionally, additional preferences for further customization. For example, the interface 150 of user input module 125 may present (via a drop-down menu, for example) a fixed set of time periods, such as 30 minutes, 1 hour, 2 hours, 5 hours, 8 hours, 10 hours, 20 hours, or any increment therein, that is shorter than the full video game experience assuming all content is experienced in a non-customized manner. Alternatively, the user interface may present a freeform input dialog box capable of receiving any time period. The user input module 125 is configured to receive the data indicative of a user-defined time period within which to play a game and store that data in one or more databases and/or communicate that data directly to the selection module 120. In some embodiments, user input module 125 may be configured to receive one or more inputs that define game attributes/parameters that would enhance the gameplay experience for the user. In an embodiment, a user may be prompted to select games designed for a predefined age group of players, using a game rating system for example, which can be input via user input module 125. In another embodiment a user may be prompted to enter a difficulty level of the games that the user would like to play, via the user input module 125. In an embodiment, a user may input game selection criteria, via user input module 125) such as but not limited to, a game type (role-play based game, for example); a character type (for example, but not limited to such example, any character, only wizards, or only knights); and/or a popularity level (for example, games that are tagged as most popular based on a large number of user ratings). In an embodiment, the user input module 125 may be configured to prompt a user to further customize the game playing experience by specifying attributes such as a storyline, one or more characters, type of events that must occur during gameplay, number of opponents, and skill level of the opponents.

Figure 1B:
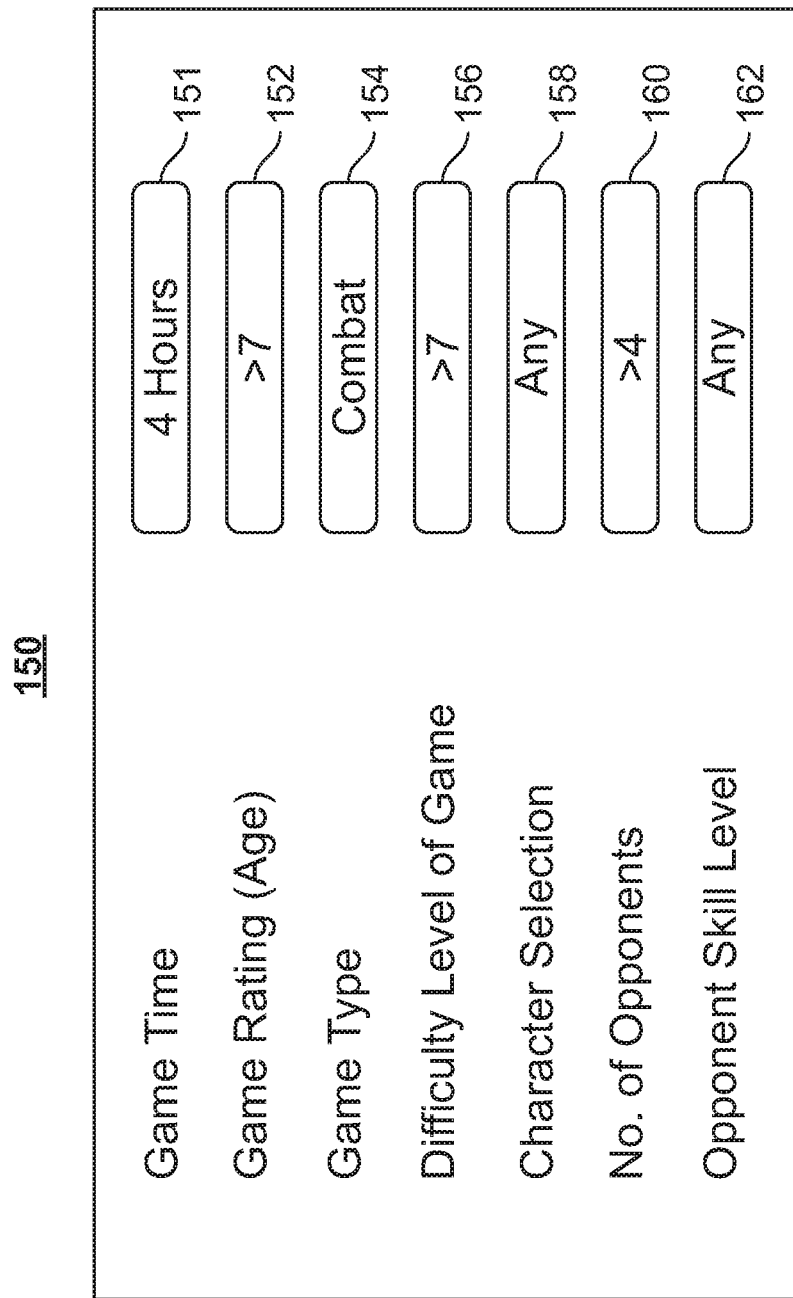
FIG. 1B is a wireframe diagram of an exemplary graphical user interface (GUI) for obtaining and generating user game preferences, in accordance with an embodiment of the present specification.

FIG. 1B is a wireframe diagram of an exemplary graphical user interface (GUI) for obtaining and generating user game preferences, in accordance with an embodiment of the present specification. In various embodiments, display 150 is generated by the user input module 125 in order to obtain at least one user criterion or preference for designing a customized gameplay experience for the user. Display 150 comprises an input box or area 151 in which a user may input a time period or duration that the user would like to play the game. In embodiments, the user may input the time period as a number of hours or any increment therein. An input box 152 is provided on the display 150 for inputting (by a user) and receiving (by the system) a user's preference regarding a preferred user rating for a game that the user would like to play. In embodiments, the user may be prompted to select a rating from provided options such as, but not limited to, '>1', >2' . . . 10, or the option 'any' if the user does not have any preference regarding the rating of the game. In embodiments, the game rating corresponds to the popularity of the game with 1 being least popular and 10 being most popular. Display 150 also comprises input boxes 154, 156, 158, 160 and 162 for receiving the user's preferences regarding the type of game; difficulty level of the game; type of characters preferred in gameplay; number of opponents in the gameplay; and a skill level of the opponents in gameplay, respectively.

In embodiments, a user may be prompted to select one of a plurality of game types such as, but not limited to action games, action-adventure games, adventure games, role-playing games, simulation games, strategy games, sports games, and puzzle games, via the input box 154. In embodiments, a user may be prompted to select one out of a predefined range of values, such as but not limited to values ranging from 1 to 5, to define a difficulty of game levels that the user would like to play via the input box 156. In embodiments, a difficulty level of 1 is designated as easy, while a difficulty level of 5 is designated as the most challenging or difficult. In embodiments, a user may be prompted to select one of a plurality of game characters such as, but not limited to wizards, witches, ogres, aliens, king, queen, princess, and nerd, that the user would like in the gameplay, via the input box 158. In an embodiment, the input box 158 may allow a user to select multiple characters. In an embodiment, the input box 158 includes "any" as a selection option so that the universe of characters is open to the player.

In embodiments, a user may be prompted to select one out of a predefined range of values, such as values ranging from a minimum of 1 player to an infinite number of players, or any increment therein, to define a number of opponents that the user would like to play with via the input box 160. Further, Input box 162 may, in an embodiment, provide a predefined range of values, ranging from '>1' to '>5', for example, or any increment therein, wherein each value defines a selectable skill level of opponents for gameplay. For each of the inputs 152, 154, 156, 158, 160, and 162, a user may select the option 'any' if the user does not have any preference regarding the respective game attribute. Allowing a user to define various game attributes along with a time that the user can play the game for enables refinement of the selection of portions of gameplay based on the user's preferences, thereby further enhancing the user's gameplay experience.

In alternate embodiments, an input box may be provided on the display 150 for inputting (by a user) and receiving (by the system) a user's preference regarding a preferred age rating for a game that the user would like to play. In embodiments, the user may be prompted to select a rating from provided options such as, standard ESRB ratings. In embodiments, this may allow a user to filter out content that may not be acceptable for some audiences.

In embodiments, "n" number of input boxes may be provided to designate selection criteria or preferences. In embodiments, the inputs described above may be free-form. In alternate embodiments, user input module 125 may generate selection criteria and provide a drop-down menu.

In an embodiment, the selection module 120 receives a user-defined time period either from the database or directly from the user input module and, based on that time period, selects portions of a video game that can be played in the user-defined time frame. In an embodiment, selection module 120 identifies content, which may be defined in terms of scenes, levels, or any discrete portion of the video game (collectively, content units), that, when combined into a structured gameplay session, would fit into the player-defined time period. The selection module 120 identifies content units by searching and/or scanning metadata associated with each content unit, determining an associated play time period based on such metadata, and determining if that play time period, when combined with other play time periods of other content, equals, is less than, or is greater than the user-defined time frame. If the collective play time period is less than the user-defined time frame, the selection module may identify additional content units to extend the collective play time. If the collective play time period is greater than the user-defined time frame, the selection module may eliminate identified content units to shorten the collective play time. If the collective play time period is equal to the user defined time frame, the selection module may transmit the identified content units to the editing module 130.

Accordingly, the selection module 120 is configured to apply the player-defined time period as a filter to identify all the content that would fit (either unedited or in edited form as described below) into the user-defined time frame. For example, if a player desires to play a video game for 10 hours, the selection module 120 selects content units of the video game that, collectively, can be played within 10 hours.

It should be appreciated that each content unit may be stored in one or more databases associated with the game servers 105, 106 and in association with metadata that defines a predefined time period required to play that content unit. Optionally, the predefined time period may be manually defined by one or more players. Optionally, the predefined time period may be determined by monitoring a time taken by a majority of players to complete the content unit, calculating a function of such time (such as taking an average of all such time periods), and defining that the predefined time period to be the calculated time period.

It should further be appreciated that each content unit may be stored in one or more databases in the system in association with metadata that defines a required relationship between content units. Accordingly, if one content unit is selected, the metadata may indicate that one or more other content units must also be selected, optionally in a particular order, or, conversely, the metadata may indicate that another content unit must not be selected.

It should further be appreciated that each content unit may be stored in one or more databases in the system in association with metadata that defines a plurality of descriptors which are indicative of different user tastes, interests, preferences, desires, likes or dislikes. Accordingly, where multiple combination of content units may satisfy the user-defined time frame, the selection of content units having metadata descriptors reflective of one or more tastes, interests, preferences, desires, or likes of the user may be prioritized for selection over other content units of similar length. Accordingly, content units may be selected based on user interest.

Each content unit may be further stored in one or more databases in the system in association with metadata that defines a plurality of other descriptors which are indicative of the subject matter of the content unit itself. For example, content units may be rated, and have their metadata reflect, other criteria, such as but not limited to, the most fun content, the most challenging experience, the scariest content, the easiest gameplay experience, or the content other similar players like the most. In embodiments, such content metadata may be determined by means of player votes or by recording how often players choose to engage with or play that content unit. In various embodiments, the selection module 120 may assign a prioritization/rating to each piece of content within a game based on specific parameters such as but not limited to: a rating obtained via average player vote, an editorial ranking provided by the game's designers and/or developers, specific types of content that the player has selected in the past (e.g. player really likes boss battles), or an importance to the overall story or narrative of the game.

Given the extent of different data which may be incorporated into the metadata, the content may be generally selected based on a plurality of criteria. In various embodiments, the selection module 120 selects content primarily based on the one or more user preferences obtained via the user input module 125, such as but not limited to those illustrated in FIG. 1B.

In an embodiment, selection module 120 selects content that maintains a narrative of the game, such as content that is rated as providing the best experience. In other embodiments, the content selected by selected module is based on certain criteria regardless of maintaining cohesion in the game's narrative. In other embodiments, content that is rated on other criteria, such as but not limited to, the most fun content (scenes or levels of the game) or rated as providing the most challenging experience, is selected by the selection module 120. In embodiments, the content rating may be obtained by means of player votes or may be determined by recording maximum player interest/play. In various embodiments, content rating data may be obtained from one or more databases associated with the game servers 105, 106. In various embodiments, the selection module 120 assigns a prioritization/rating to each piece of content within a game based on specific parameters such as but not limited to: rating obtained via average player vote, editorial ranking provided by the game's creators, specific types of content that the player has selected in the past (e.g. player really likes boss battles), or importance to the overall story/narrative of the game. In an embodiment, a rating of each piece of content may be based on either player feedback or editorial feedback. In embodiments, player or editorial feedback may be obtained through in-game interfaces designed for receiving feedback. For example, after each level of gameplay a player may be prompted to rate the last completed level. In another embodiment, application interfaces specifically designed to enable players to provide feedback regarding video games or game levels may be used. In other embodiments, editorial ratings based on, for example, in-house video game developers or external game critics may be used to rate each piece of video game content. In an embodiment, video game developers may also be prompted to tag predefined sections of the game content based on how essential said section is to the plotline of the video game. For example, video game developers may be prompted to tag certain portions of the game as 'essential' and certain other portions as 'non-essential' to an overall storyline of the game. These tags are then used by the selection module 120 for assigning a prioritization/rating to each piece of the content.

Optionally and additionally, the selection module 120 determines the extent and nature of virtual gear required by a player to play the scenes of the identified content units and allocates such virtual gear to the player. In various embodiments, the required virtual gear is determined by obtaining, from the metadata stored in association with each content unit, the preferred virtual gear required to play each content unit. The preferred virtual gear may be determined by the game's designers and/or developers or may be determined by monitoring the average amount and/or types of virtual gear used by other players.

In various embodiments, the selection module 120 identifies content that either fits into the user-defined time frame or may be culled to fit into the time frame. In embodiments, for video games comprising procedurally generated levels, an editing module 130 generates smaller levels to fit within the user-defined time frame. In an embodiment, the editing module 130 generates smaller culled levels from multiple procedurally generated levels to fit within the user-defined time frame and then stitches the smaller culled levels together. In other embodiments, where one or more portions of game comprise content that fit into the user defined time frame, said portions are selected and stitched together by the editing module 130 without modifying the content. For video games with procedurally generated levels, parameters such as, but not limited to numbers of enemies, level of the enemies, number of floors in the dungeon, number of mini-bosses, number of rooms, and/or number of dead ends may be modified (such as by increasing or decreasing) by the editing module 130, in order to reduce the time needed to complete a level of the game.

In an embodiment, for video games comprising non-procedurally generated game levels, editing module 130 reduces the gameplay time needed for a specific piece of content by providing a player with high level gear or gear specific to the weaknesses of the enemies found in that content unit, by turning on full visibility on a game map or adding navigational guidance for the player, by adding auto-save functionality to prevent loss of time when the player loses a life in the game, or by any of the procedural generation modifiers mentioned above if the editing module 130 has access to the underlying object code of the video game.

In other embodiments, the editing module 130 stitches together selected content units as they exist in unedited form to make the game fit into the player defined time frame, rather than modifying the game content, in cases where one or more portions of a game comprise content that fit into the user defined time frame. In an embodiment, the editing module 130 also adds messages or bumpers before each content unit that explains any narrative gaps or game play moves that a player should know before launching into that game scene, as described below with respect to FIG. 3.

Figure 2:
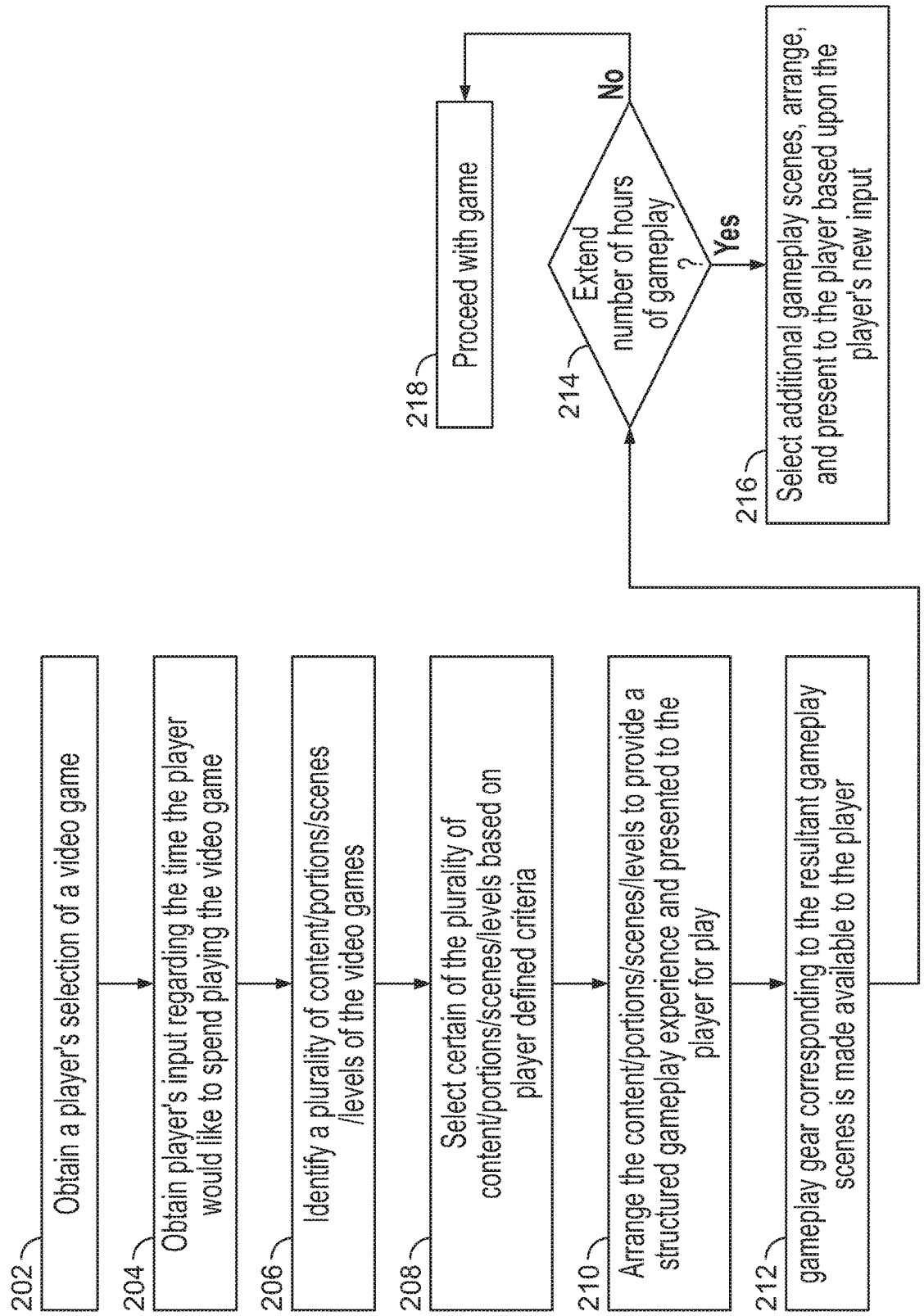
FIG. 2 is a flowchart illustrating a method of providing video game content to fit within a player-defined time period, in accordance with an embodiment of the present specification.

FIG. 2 is a flowchart showing a plurality of steps for a method of providing truncated video game content that fits within a player defined time period, in accordance with an embodiment of the present specification. With reference to FIGS. 1 and 2, at step 202, using the user input module 125, the player provides the system with a video game selection. At step 204, using the user input module 125, the player provides the system with a time period for which the player would like to play the video game. At step 206, using the user input module 125, the player selects a plurality of descriptors, identifiers, or other criteria that, when used as filters and applied to the metadata associated with the content units, enable a selection of content units that may be aggregated into a player-defined permutation of the game.

In an embodiment, after receiving a player's selection of video game and based on the player's input, at step 208, the selection module 120 of the system applies the player-defined filters to the game scenes and selects scenes/content based on a plurality of criteria.

As previously described, each content unit may be tagged using metadata tags wherein the metadata includes information that conveys different aspects of the content unit. In some embodiments, the metadata information comprises, but is not limited to, a time taken to complete a scene in the content unit, and body gear required to complete a scene in the content unit. In other embodiments, the metadata information comprises information defining an 'experience' associated with the content unit. For example, metadata tags may read 'fun', 'challenging', 'scary' or 'easy'. In an embodiment, the metadata information comprises information defining the number of players required to play each of the content units. For example, a metadata tag may read as '2 players' or 'single player' defining that the respective content unit is required to be played by two players or a single player respectively. In another embodiment, the metadata information comprises information defining a 'category' or 'type' of the content unit. For example, metadata tags may read 'puzzle', 'battle', 'car-chase', 'action', 'adventure' or 'fantasy', describing the kind of gameplay involved in a respective content unit.

The metadata tagging of each scene of video games may be performed by a game server and stored in a database coupled with the game server. In various embodiments, one or more scenes may be tagged as scenes that must be selected together and played linearly in order to maintain the game's narrative. In embodiments, certain scenes are defined or tagged as scenes that must be included in every gameplay. In other embodiments, a pre-defined sequence of scenes may be selected, wherein the scenes correspond to a predefined player rating. Such scenes may be tagged such that they are played only in the defined sequence within the time period defined by the player.

In an embodiment, the selection module 120 filters the selected content to ensure that it will fit within the number of hours input by the player, either in unedited or edited form. Optionally, the scenes or game content are curated by editing module 130 to reflect reduced levels so that they fit within the player-specified time period. In an embodiment, the selected scenes are time-tagged by determining an average amount of time players require for completing each selected scene so that the player-defined time period can be applied as a filter to identify all the content that would fit into said time period. In embodiments, the average amount of time that players require for completing each selected scene may be pre-recorded and may be obtained from a database coupled with the gaming system executing the present method. In another embodiment, the average amount of time that players require for completing each selected scene may be an editorially assigned amount of time, or the average amount of time it takes for players with a similar skillset as the player to complete said scenes of gameplay.

In an embodiment, selection module 120 selects content that maintains a narrative of the game, such as content that is rated as providing the best experience. In other embodiments, the content selected by selected module is based on certain criteria regardless of maintaining cohesion in the game's narrative, such as but not limited to, the most fun content (scenes or levels of the game) or rated as providing the most challenging experience, is selected by the selection module 120. In embodiments, the content rating for the video game may be obtained by means of player votes or may be determined by recording maximum player interest/play. In embodiments, the content rating may be obtained by means of player votes or may be determined by recording maximum player interest/play. In some embodiments, said scene/content selection may be performed based on a prioritization/rating of each piece of content within the game based on specific parameters such as those described above (rating obtained via average player vote, editorial ranking provided by the game's creators, specific types of content that the player has selected in the past (e.g. player really likes boss battles), or importance to the overall story/narrative of the game).

At step 210, in an embodiment, the editing module 130 aggregates the selected content for presentation to the player. In embodiments, the editing module aggregates the content units and stitches them together into a structured gameplay order, such as linear gameplay experience that fits within the number of hours input by the player. In embodiments, certain scenes tagged for a predefined sequential play are stitched in accordance with the defined order. In an embodiment, one or more messages or bumpers are added before each selected scene that explains any narrative gaps or game play moves that the player should know before launching into that scene.

Figure 3A:
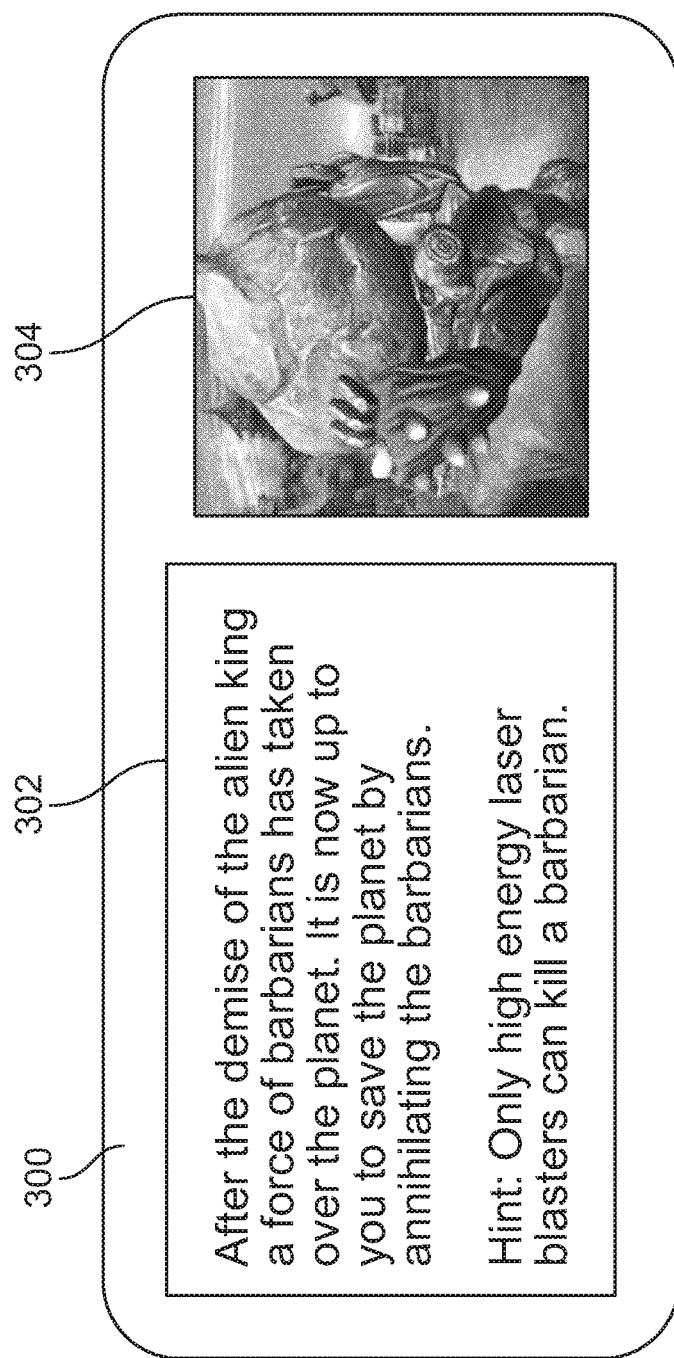
FIG. 3A illustrates a screenshot of a message screen displayed to a user prior to commencement of an edited game scene by the player, in accordance with an embodiment of the present specification.

FIG. 3A illustrates a screenshot of a message screen displayed to a user prior to commencement of an edited game scene, in accordance with an embodiment of the present specification. In an embodiment, the message is displayed after the user completes an edited game scene and before commencement of a subsequent stitched or edited game scene. Screenshot 300 comprises a message section 302 for displaying a message introducing to the player an upcoming scene and/or a game-story narrative that has occurred between the completed scene and the upcoming scene. The message section 302 also provides to the player any additional information required to play the up-coming game scene. In FIG. 3, an exemplary message 302 conveys to the player the following narrative: "[a]fter the demise of the alien king a force of barbarians has taken over the planet. It is now up to you to save the planet by annihilating the barbarians. Hint: Only high energy laser blasters can kill a barbarian." Screenshot 300 also comprises an optional section 304 for displaying an image indicative of the upcoming scene of the edited gameplay session.

Figure 3B:
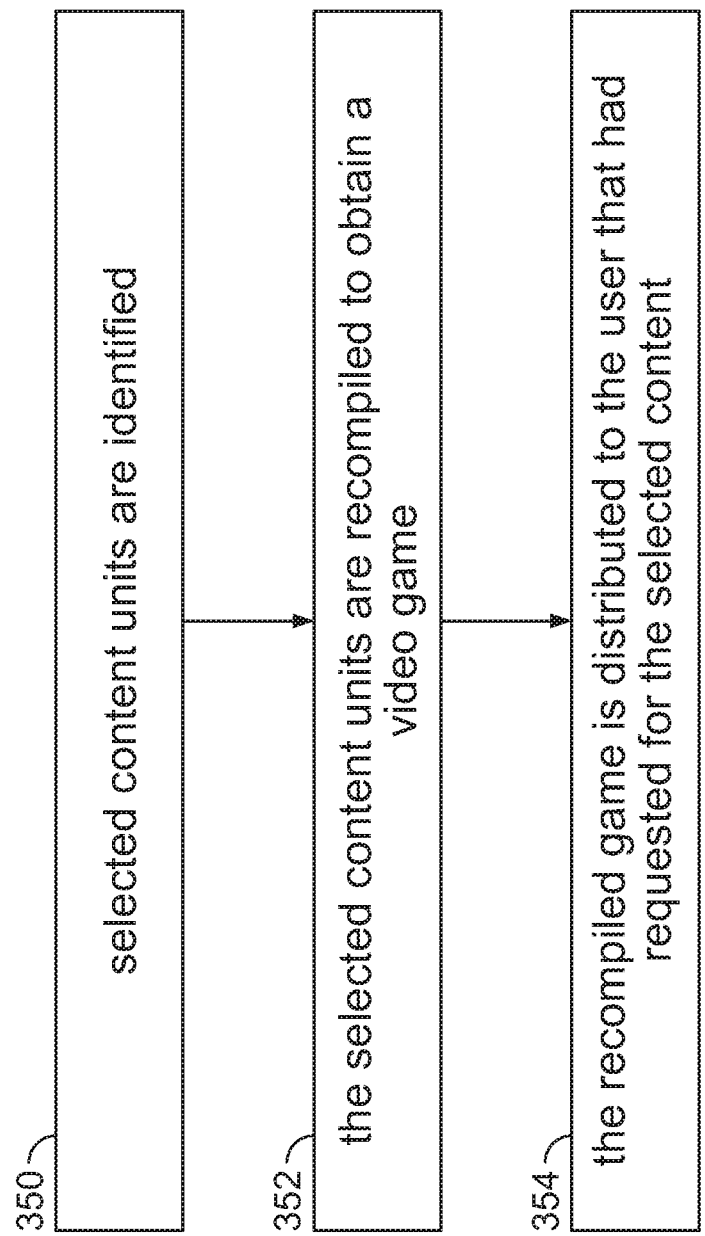
FIG. 3B is a flowchart illustrating a method for aggregating selected content for presentation to a user, in accordance with an embodiment of the present specification.

FIG. 3B is a flowchart illustrating a method for aggregating the selected content for presentation to the player, in accordance with an embodiment of the present specification. At step 350 selected content units are identified. In embodiments, as explained above, the content units are selected by the selection module 120 (shown in FIG. 1A) based on at least one user preference collected via the user input module 125 (shown in FIG. 1B) and the metadata tags stored with respect to each content unit. At step 352, the selected content units are recompiled to obtain a video game comprising only the selected content units. In an embodiment, the selected content units are recompiled to obtain a coherent sequential narrative of gameplay. At step 354, the recompiled game is distributed to the user that had requested for the selected content. In another embodiment, where the game is streamed to the user, recompilation may not be required and each content unit may be sequentially arranged and streamed one after the other to the user. In yet another embodiment, a video game may be developed such that different versions of the gameplay are designed to fit a plurality of different time durations. In such a case, when a user requests to play a game for one of the plurality of said different durations, a corresponding version of gameplay is selected and conveyed to the user from a plurality of pre-built or pre-collated versions.

Figure 4:
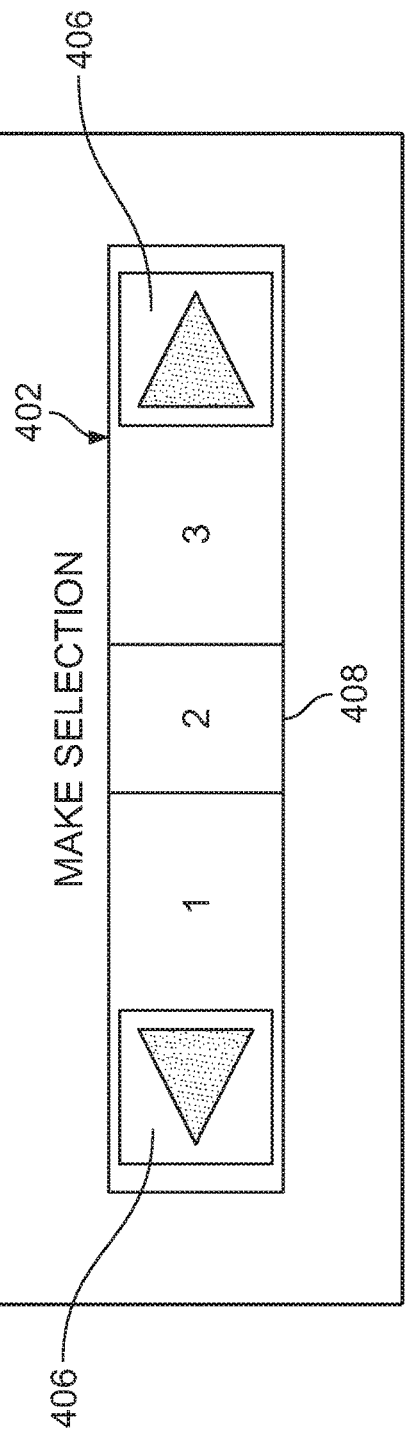
FIG. 4 illustrates a screenshot of a screen presented to a user prompting the user to select desired gear, in accordance with an embodiment of the present specification.

At step 212, gameplay gear corresponding to the edited gameplay scenes is made available to the player. In various embodiments, the required game gear is determined by obtaining pre-recorded information regarding the gear required to play each scene of the game by an average player. In an embodiment, the player is allowed to choose the extent or nature of the gear by providing a GUI based slider or drop-down menu that can be pointed to options such as 'minimum gear', 'average gear', 'well geared', and 'best possible gear at that point in the game' before the commencement of each scene. FIG. 4 illustrates a screenshot of a screen presented to a user prompting the user to select gear, in accordance with an embodiment of the present specification. As shown in FIG. 4, screenshot 400 comprises a slider frame 402 comprising sliders arrows 406, which can be used by the player to select or toggle between gear levels on scale 408, such as levels 1, 2, or 3. Screenshot 400 also comprises a section 410 which provides a guide to the scale 408 by displaying the definitions of the selection number. For example, 1 may be used to denote minimum gear, 2 may be used to denote average gear, and 3 may be used to denote maximum gear. As would be apparent, screenshot 400 displays only one out of a plurality of ways in which a game user may be prompted to select an extent of gear for aiding the user's gameplay. In embodiments, a different scale may be selected for the extent of gear. In embodiments, individual pieces of gear may be selected. In embodiments, a drop-down menu may be employed. In embodiments, a checkbox-type selection method may be employed.

In embodiments, during the gameplay of the edited scenes and at predefined intervals, the system determines if the player is completing the scenes within the time allocated to each scene. If the player is taking longer than the allocated time for any scene, the player is presented with options such as: moving to the next scene or piece of content, continuing to play the current scene, or causing the game content to be re-designed or reallocated to fit into the remaining time available with the player. In an embodiment, if the player chooses to continue to play the current piece of content, gameplay may either exceed the player-defined time period or may cease at the end of the player-defined time period in such a manner that the player may not be able to complete all selected and edited content. In another embodiment, the selected pieces of content may be recalculated or prioritized differently based on the time remaining. For example, if the player has played three hours of a five hour gameplay session, but is only 20% through the gameplay content that has been selected for the player, the player may choose an option of re-defining the gameplay content to fit in the remaining two hours.

At step 214, during the gameplay of the selected scenes, it is determined if the player wishes to extend the gameplay experience by extending the numbers of hours of gameplay. If it is determined that the player would like to extend the gameplay experience by extending the numbers of hours of gameplay, additional gameplay scenes are selected, edited and presented to the player based upon the player's new input at step 216. If the player does not wish to extent gameplay, at step 218, the player proceeds through the game through the earlier player-defined time period.

In an embodiment, the method of the present specification may be extended to a plurality of video games, wherein scenes from multiple video games may be selected and edited to fit within a player defined time period. In such embodiments, a plurality of compatible video games are identified and selected based on one or more metadata tags of the games describing information such as, but not limited to a 'genre', 'type', 'rating' or 'difficulty level' of the games. In embodiments, content units may be selected from video games of a similar genre. In another embodiment, the content units may be selected from video games falling under different genres. For example, a player may provide a preference for boss battle-based games and a defined number of hours available for gameplay. In an embodiment, the system of the present specification may select boss battle based scenes from a plurality of video games and edit the selected content units to fit into the player defined time period. In embodiments, the selection of the games for making said scene selection may be made based on a plurality of criteria such as but not limited to the player's game playing history, ratings given by the player to games played in the past, ratings given by other players, and editorial selection. In some embodiments, content units may be tagged using universal metadata tags wherein the metadata comprises information conveying a plurality of aspects of the content units across multiple games and genres of games. In embodiments, metadata tags of content unit selected from different video games comprise information such as, but not limited to, age/content rating, difficulty, year of release, and language used for narrating the game-story.

In various embodiments, the cloud-based system architecture as described with reference to FIG. 1 enables seamless switching between games, thereby allowing players cross-game play sessions edited to fit within a desired time period.

In an embodiment, the systems and methods of the present specification may be used to provide a time-based play where multiple players may compete for completing a set of selected scenes based on a popular genre. In the time-trial challenge embodiment, a first player may select certain content, such as a set of boss battles, and challenge second or additional players to determine who can complete them the fastest. For example, video games based on racing allow users to compete against each other in time trials. In an embodiment, a user may select such time-trial based asynchronous challenges where players complete their runs while playing individually, and the results of each competing player is collected and sorted by the gaming system of the present specification. In another embodiment, a user may select to play time-trial based synchronous challenges where all the competing players play together, competing with each other to reach a finish line, and wherein the results of each player are determined by the gaming system.

In embodiments, players may choose to create entire leagues based on curated content gameplay. In such embodiments, challenges may be compiled and time scores may be tracked to determine rankings within the group or league. In embodiments, an e-sport athlete or social gaming influencers favorite content or top picks may be stitched together to form various time-based gameplay sessions, providing the player with "premium" or "VIP" content. In embodiments, these curated gameplay sessions may be 5, 10, 15, 20 hours or more or any increment therein.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for generating, in real-time, a video game tailored to a player-defined time period, the video game having a standard gameplay time greater than the player-defined time period, the method comprising:
   receiving the player-defined time period;
   selecting one or more content units of the video game based on the player-defined time period, wherein the one or more content units are defined by a collective time period;
   editing the selected one or more content units such that the collective time period is equal to or less than the player-defined time period;
   selecting one or more game gear items required for playing the selected one or more content units based on at least one of a plurality of pre-defined criteria;
   generating a tailored gameplay session comprising the edited one or more content units and selected one or more gear items for the player to play;
   dynamically determining if the player is completing the one or more content units within a pre-defined time allocated for each of the one or more content units; and
   providing one or more pre-defined options for completing the one or more content units within the player-defined time period if the player is not completing the one or more content units within the pre-defined time allocated for each of the one or more content units.

2. The method of claim 1 further comprising:
   determining if the player wants to alter the player-defined time period to a new time period;
   if the player wants to alter the player defined time period to a new time period, selecting the one or more content units based on at least one of a plurality of pre-defined criteria;
   editing the one or more content units to have a collective time period that is equal to or less than the new time period;
   selecting one or more gear items required for playing the one or more content units based on at least one of a plurality of pre-defined criteria; and
   generating a new tailored gameplay session comprising the edited one or more content units and one or more gear items for the player for play.

3. The method of claim 2 wherein the new time period is longer than the player defined time period.

4. The method of claim 2 wherein the new time period is shorter than the player defined time period.

5. The method of claim 1 further comprising: selecting the one or more content units based on at least one of a plurality of pre-defined criteria, wherein the plurality of pre-defined criteria comprises at least one of selecting one or more content units rated as providing a best experience while maintaining a narrative of the game; selecting one or more content units rated as being most fun regardless of maintaining cohesion in the narrative of the game; and selecting one or more content units rated as providing a most challenging experience.

6. The method of claim 1 wherein selecting one or more content units further comprises determining an amount of time required for completing each selected of the one or more content units and applying the player-defined time period as a filter to identify all of the one or more content units having the collective time period that is less than or equal to the player-defined time period.

7. The method of claim 6 further comprising editing the one or more content units to provide a linear gameplay experience to the player.

8. The method of claim 1 further comprising adding one or more messages before each of the selected one or more content units for explaining a narrative corresponding to the gameplay session.

9. The method of claim 1 wherein presenting the selected game gear to the player comprises enabling the player to select an extent of game gear ranging from 'minimum gear' to 'maximum gear'.

10. A system for generating, in real-time, a video game tailored to a player-defined time period, the video game having a standard gameplay time greater than the player-defined time period, the system comprising one or more game servers for hosting the game and a plurality of client processors for executing an instance of the game communicated by the one or more game servers via a network coupling the client processors to the game servers, said game servers comprising one or more processors configured to execute a plurality of executable programmatic instructions to generate, in real-time, the video game tailored to a player-defined time period, the programmatic instructions forming:
 a user interface module which when executed receives the player-defined time period;
 a selection module which when executed selects one or more content units of the video game based on the player-defined time period, and one or more game gear items required for playing the selected one or more content units based on at least one of a plurality of pre-defined criteria, wherein the one or more content units are defined by a collective time period;
 an editing module which when executed edits the selected one or more content units such that the collective time period is equal to or less than the player-defined time period for generating a tailored gameplay session comprising the edited one or more content units and selected one or more gear items for the player to play;
 wherein the selection module when executed further selects a second set of content units based on at least one of a plurality of pre-defined criteria, if the player wants to alter the player defined time period to a new time period, and a second set of game gear items required for playing the second set of content units based on at least one of a plurality of pre-defined criteria, and wherein the editing module when executed further edits the second set of content units to have a collective time period that is equal to or less than the new time period, and generates a new tailored gameplay session comprising the edited second set of content units and the second set of gear items for the player for play.

11. The system of claim 10 wherein the one or more game servers are coupled with at least one database for storing a plurality of video games, each video game comprising discrete content units, each content unit being associated with a metadata tag.

12. The system of claim 11 wherein each metadata tag comprises predefined characteristics of an associated video game content unit.

13. The system of claim 12 wherein the predefined characteristics comprise one or more of: a time to complete playing a portion of the content unit of the video game, a required relationship with one or more other content units, and one or more descriptors indicative of the subject matter of the content unit.

14. The system of claim 13 wherein the one or more descriptors indicative of the subject matter of the content unit comprise one or more of: most fun content, most challenging experience, scariest content, easiest gameplay experience, and liked most by other similar players.

15. The system of claim 11 wherein the metadata tags are used by the selection module for selecting one or more content units of the video game based on the player-defined time period.

16. The system of claim 10 wherein the selection module when executed further dynamically determines if the player is completing the one or more content units within a pre-defined time allocated for each of the one or more content units; and provides one or more pre-defined options for completing the one or more content units within the player-defined time period if the player is not completing the one or more content units within the pre-defined time allocated for each of the one or more content units.

17. The system of claim 10 wherein the one or more game servers are implemented by a cloud of computing platforms operating together as game servers.

18. A method for generating, in real-time, a video game tailored to a player-defined time period, the video game having a standard gameplay time greater than the player-defined time period, the method comprising:
 receiving the player-defined time period;
 selecting one or more content units of the video game based on the player-defined time period, wherein the one or more content units are defined by a collective time period;
 editing the selected one or more content units such that the collective time period is equal to or less than the player-defined time period;
 selecting one or more game gear items required for playing the selected one or more content units based on at least one of a plurality of pre-defined criteria;
 generating a tailored gameplay session comprising the edited one or more content units and selected one or more gear items for the player to play; and
 adding one or more messages before each of the selected one or more content units for explaining a narrative corresponding to the gameplay session.

19. The method of claim 18 further comprising:
 determining if the player wants to alter the player-defined time period to a new time period;
 if the player wants to alter the player defined time period to a new time period, selecting the one or more content units based on at least one of a plurality of pre-defined criteria;
 editing the one or more content units to have a collective time period that is equal to or less than the new time period;
 selecting one or more game gear items required for playing the one or more content units based on at least one of a plurality of pre-defined criteria; and
 generating a new tailored gameplay session comprising the edited one or more content units and one or more gear items for the player for play.

20. The method of claim 19, wherein the new time period is longer than the player defined time period.

21. The method of claim 19, wherein the new time period is shorter than the player defined time period.

22. The method of claim 18 further comprising: selecting the one or more content units based on at least one of a plurality of pre-defined criteria, wherein the plurality of pre-defined criteria comprises at least one of selecting one or more content units rated as providing a best experience while maintaining a narrative of the game; selecting one or more content units rated as being most fun regardless of maintaining cohesion in the narrative of the game; and selecting one or more content units rated as providing a most challenging experience.

23. The method of claim 18, wherein selecting one or more content units further comprises determining an amount of time required for completing each selected of the one or more content units and applying the player-defined time period as a filter to identify all of the one or more content units having the collective time period that is less than or equal to the player-defined time period.

24. The method of claim 18, wherein presenting the selected game gear to the player comprises enabling the player to select an extent of game gear ranging from 'minimum gear' to 'maximum gear'.

25. A system for generating, in real-time, a video game tailored to a player-defined time period, the video game having a standard gameplay time greater than the player-defined time period, the system comprising one or more game servers for hosting the game and a plurality of client processors for executing an instance of the game communicated by the one or more game servers via a network coupling the client processors to the game servers, said game servers comprising one or more processors configured to execute a plurality of executable programmatic instructions to generate, in real-time, the video game tailored to a player-defined time period, the programmatic instructions forming:
    a user interface module which when executed receives the player-defined time period;
    a selection module which when executed selects one or more content units of the video game based on the player-defined time period, and one or more game gear items required for playing the selected one or more content units based on at least one of a plurality of pre-defined criteria, wherein the one or more content units are defined by a collective time period;
    an editing module which when executed edits the selected one or more content units such that the collective time period is equal to or less than the player-defined time period for generating a tailored gameplay session comprising the edited one or more content units and selected one or more gear items for the player to play, wherein the selection module when executed further dynamically determines if the player is completing the one or more content units within a pre-defined time allocated for each of the one or more content units and provides one or more pre-defined options for completing the one or more content units within the player-defined time period if the player is not completing the one or more content units within the pre-defined time allocated for each of the one or more content units.

26. The system of claim 25, wherein the one or more game servers are coupled with at least one database for storing a plurality of video games, each video game comprising discrete content units, each content unit being associated with a metadata tag.

27. The system of claim 26, wherein each metadata tag comprises predefined characteristics of an associated video game content unit.

28. The system of claim 27, wherein the predefined characteristics comprise one or more of: a time to complete playing a portion of the content unit of the video game, a required relationship with one or more other content units, and one or more descriptors indicative of the subject matter of the content unit.

29. The system of claim 28, wherein the one or more descriptors indicative of the subject matter of the content unit comprise one or more of: most fun content, most challenging experience, scariest content, easiest gameplay experience, and liked most by other similar players.

30. The system of claim 26, wherein the metadata tags are used by the selection module for selecting one or more content units of the video game based on the player-defined time period.

31. The system of claim 25, wherein the one or more game servers are implemented by a cloud of computing platforms operating together as game servers.

* * * * *